Figure 1:
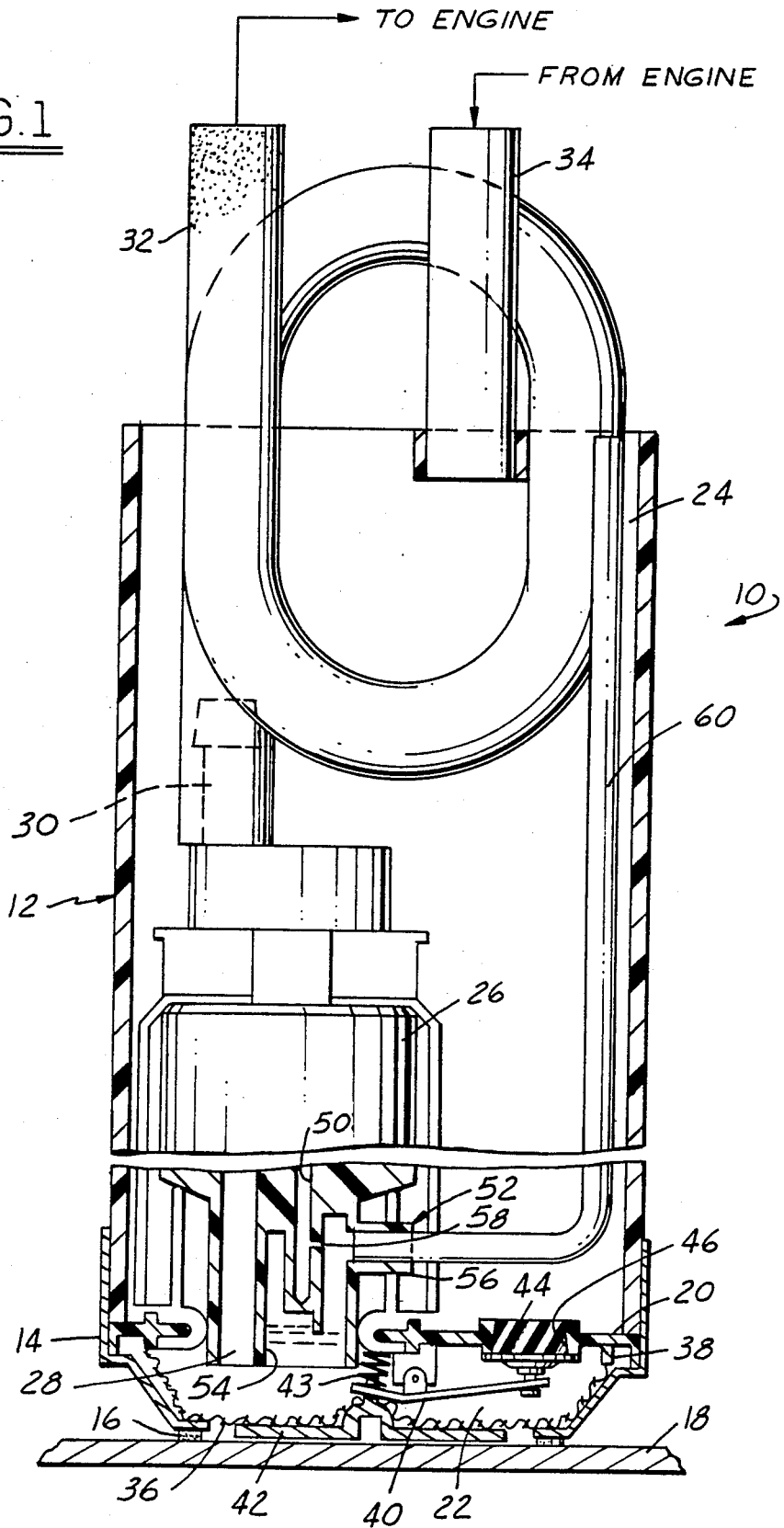

United States Patent [19]

Tuckey

[11] Patent Number: 4,878,816

[45] Date of Patent: * Nov. 7, 1989

[54] IN-TANK FUEL RESERVOIR WITH FUEL VAPOR SEPARATION

[75] Inventor: Charles H. Tuckey, Cass City, Mich.

[73] Assignee: Walbro Corporation, Cass City, Mich.

[ * ] Notice: The portion of the term of this patent subsequent to Nov. 7, 2006 has been disclaimed.

[21] Appl. No.: 201,633

[22] Filed: Jun. 2, 1988

Related U.S. Application Data

[63] Continuation-in-part of Ser. No. 153,316, Feb. 8, 1988, Pat. No. 4,831,990, which is a continuation-in-part of Ser. No. 49,537, May 14, 1987, Pat. No. 4,807,582, which is a continuation-in-part of Ser. No. 928,184, Nov. 7, 1986, Pat. No. 4,747,388.

[51] Int. Cl.$^4$ .................... B60K 15/02; F04F 5/02
[52] U.S. Cl. ................... 417/76; 123/510; 137/566; 137/576; 417/87
[58] Field of Search ............ 137/448, 574, 575, 576, 137/566; 417/76, 85, 87, 89, 191, 249, 410; 123/510, 514, 516

[56] References Cited

U.S. PATENT DOCUMENTS

| 2,263,296 | 11/1941 | Grise | 417/249 X |
|---|---|---|---|
| 2,707,021 | 4/1955 | Harris | 417/76 X |
| 2,763,281 | 9/1956 | Morgan | 417/249 X |
| 2,953,156 | 9/1960 | Bryant | 417/249 X |
| 4,279,232 | 7/1981 | Schuster et al. | 123/516 |
| 4,397,333 | 8/1983 | Liba et al. | 123/514 X |
| 4,546,750 | 10/1985 | Brunell et al. | 137/576 X |
| 4,596,519 | 6/1986 | Tuckey | 418/15 |

FOREIGN PATENT DOCUMENTS 2172864 10/1986 United Kingdom .

Primary Examiner—Stephen M. Hepperle
Attorney, Agent, or Firm—Barnes, Kisselle, Raisch, Choate, Whittemore & Hulbert

[57] ABSTRACT

A fuel delivery system for automotive engine and like applications which comprises a canister for positioning within a fuel tank having a lower end with a fuel opening and an internal wall spaced from such lower end dividing the canister into upper and lower fuel chambers. An electric-motor fuel pump is positioned within the upper chamber, has a fuel inlet coupled to the lower chamber through the canister wall and a primary outlet for feeding fuel under pressure to an engine. A fluid conduit separate from the pump inlet extends through the upper and lower chamber-separating wall, with an inlet end being positioned within the lower chamber and an outlet end being positioned within the upper chamber. A secondary outlet from the pump supplies fuel under pressure through a nozzle to the fluid conduit for aspirating vapor and fuel through the fluid conduit into the upper chamber. Any vapors entrained in the fuel fed to the upper canister chamber are thus permitted to vent through the canister top.

5 Claims, 1 Drawing Sheet

U.S. Patent   Nov. 7, 1989   4,878,816

IN-TANK FUEL RESERVOIR WITH FUEL VAPOR SEPARATION

This application is a continuation-in-part of application Ser. No. 153,316, filed Feb. 8, 1988 now U.S. Pat. No. 4,831,990 which is a continuation-in-part of application Ser. No. 49,537, filed May 14, 1987, now U.S. Pat. No. 4,807,582 which is a continuation-in-part of application Ser. No. 928,184, filed Nov. 7, 1986, now U.S. Pat. No. 4,747,388.

The present invention is directed to fuel delivery systems for automotive engine and like applications, and more particularly to a fuel pump module which includes an electric fuel pump mounted within an in-tank reservoir.

U.S. application Ser. No. 928,184, filed Nov. 7, 1986, discloses a fuel delivery system for automotive vehicles which includes a fuel canister positioned within a fuel tank and containing an electric-motor fuel pump. The canister has an open lower end positioned at the bottom of the fuel tank, and an internal wall spaced from the open end to define separate upper and lower fuel canister chambers. The fuel pump is positioned within the upper chamber, has an inlet coupled to the lower chamber for drawing fuel therefrom, and an outlet for feeding fuel under pressure to an engine or the like. A pressure regulator valve bypasses excess fuel which is returned to the upper canister chamber, which thus forms a fuel reservoir surrounding the fuel pump. A filter diaphragm spans the open lower end of the canister and is characterized by permitting free flow of liquid fuel therethrough, while being closed by surface tension of liquid fuel to restrict passage of air therethrough. The diaphragm is coupled by a lever to a valve in the canister wall so that, in the absence of fuel at the open canister end, the diaphragm is drawn into the lower chamber by fuel pump suction and opens the valve, so that fuel is made available to the pump inlet from the upper chamber reservoir.

Although the fuel delivery system so disclosed in the noted patent application has enjoyed substantial acceptance and success, improvements remain desirable. In particular, heat of excess fuel returned from the engine, particularly in combination with highly volatile so-called winterized fuel blends, can lead to accumulation of vapor within the lower chamber and vapor lock at the fuel pump inlet. It is therefore an object of the present invention to provide a mechanism for venting any vapors trapped within the lower canister chamber, and thereby prevent delivery thereof to the fuel pump inlet and consequent potential vapor lock of the fuel delivery system.

In accordance with the present invention, a fuel delivery system for automotive engine and like applications comprises a canister for positioning within a fuel tank having a lower end with a fuel opening and an internal wall spaced from such lower end dividing the canister into upper and lower fuel chambers. An electric-motor fuel pump is positioned within the upper chamber, has a fuel inlet coupled to the lower chamber through the canister wall and a primary outlet for feeding fuel under pressure to an engine. A fluid conduit separate from the pump inlet extends through the upper and lower chamber-separating wall, with an inlet end being positioned within the lower chamber and an outlet end being positioned within the upper chamber. Another outlet from the base of the pump body supplies fuel under pressure through a nozzle to the outlet end of the fluid conduit for aspirating vapor and fuel through the fluid conduit into the upper chamber. Any vapors entrained in the fuel fed to the upper canister chamber are thus permitted to vent through the canister top.

The fluid jet conduit includes a first or inlet portion parallel to the canister axis, and a second or outlet portion extending laterally or radially therefrom. The aspiration nozzle preferably comprises an orifice in the sidewall of the fluid conduit in coaxial alignment with and diametrically opposed to the laterally extending outlet portion of the fluid conduit. Most preferably, a standpipe extends upwardly from the conduit outlet portion to a position corresponding to maximum desired fuel level within the canister upper chamber.

The invention, together with additional objects, features and advantages thereof, will be best understood from the following description, the appended claims and the accompanying drawing which is a fragmentary sectional view in side elevation of a fuel delivery module in accordance with a presently preferred embodiment of the invention.

The drawing illustrates a fuel delivery module 10 in accordance with a presently preferred embodiment of the invention as comprising a substantially cylindrical canister 12 having an open top and bottom. A canister support 14 encircles the open lower edge of canister 12 and is adapted to rest on the bottom of a fuel tank 18. An internal wall 20 within canister 12 forms and separates a lower chamber 22 at the open bottom of canister 12 from an upper chamber 24. A circumferential opening 16 in support 14 admits fuel to lower chamber 22 from the surrounding fuel tank. An electric-motor fuel pump 26 is positioned within upper chamber 24. Pump 26 has an inlet 28 which extends through wall 20 to draw fuel from lower chamber 22, and has a primary outlet 30 for delivering fuel under pressure through a suitable fuel line 32 to an engine or other fuel consumer. Excess fuel from the engine is returned through a line 34 to upper canister chamber 24.

A mesh filter 36 spans the open lower end of canister 12, being ultrasonically welded around its periphery to an annular shoulder 38 on wall 20. A lever 40 has a central portion pivotally mounted to wall 20 within lower chamber 22 and is coupled at one end to a web 42 centrally carried by filter 36. A spring 43 is captured in compression between lever 40 and wall 20 for urging lever 40 and web 42 in the downward direction. The opposing end of lever 40 is coupled to a valve element 44 positioned within an opening or passage 46 in wall 20. Filter 36 is characterized by permitting free passage of liquid fuel therethrough, while being closed by surface tension of liquid fuel to restrict passage of air therethrough. Thus, in the event of absence of fuel available through opening 16, suction pressure of pump 26 pulls filter 36 upwardly against the force of spring 43, with lever 40 thus moving valve 44 downwardly and thereby permitting flow of fuel from upper chamber 24 into lower chamber 22 and thence to pump inlet 28. On the other hand, as long as fuel is available at opening 16, valve element 44 is urged by spring 43 to the closed position illustrated in the drawing. To the extent thus far described, fuel module 10 is essentially similar to the those disclosed in the aboveidentified applications, to which reference may be had for further detailed discussion.

In accordance with the present invention, pump 26 has a secondary outlet 50 which extends downwardly therefrom adjacent and parallel to inlet passage 28. With the exception of secondary fuel outlet 50, pump 44 is as disclosed in U.S. Pat. No. 4,596,519 assigned to the assignee hereof and incorporated herein by reference. Secondary outlet 50 is formed in the pump of the referenced disclosure as a passage which extends to the case or volume which surrounds the pump rotor and is at pump outlet pressure. Secondary outlet 50 delivers fuel under pressure at a lesser volume than primary outlet 30. A fluid conduit 52 includes an inlet portion 54 which extends upwardly from lower chamber 22 parallel to pump inlet 28, and an outlet portion 56 which extends laterally or radially from inlet portion 54 into upper chamber 24. A nozzle in the form of an orifice 58 extends through the wall of fluid conduit 52 in axial opposed alignment with conduit outlet portion 56 and couples conduit 52 to secondary pump outlet 50. It will be noted that the inlet portion 54 of conduit 52 is in the form of an enlarged chamber positioned laterally adjacent to pump inlet 28. A standpipe 60 extends from conduit outlet portion 56 upwardly within canister upper chamber 24 to a position corresponding to the maximum desired level of fuel within canister chamber 24.

In operation, fuel is drawn by pump 26 through inlet 28 and fed through outlet 30 to the engine as previously described. In the meantime, a lesser quantity of fuel supplied at secondary pump outlet 50 is fed under pressure through nozzle orifice 58 and thereby jet-aspirates vapor and fuel from within lower chamber 22 through standpipe 60 to the top of upper chamber 24. Any vapors entrained in fuel entering opening 16 are thereby expelled through standpipe 60 at the upper end of canister 12. The location of the top of standpipe 60 at the maximum fuel level of the canister prevents any backflow of fuel into the standpipe.

The invention claimed is:

1. A fuel delivery system for automotive engines and the like comprising:

a canister for positioning within a fuel tank and having a lower end with an opening and means forming an internal wall spaced from said lower end and dividing said canister into upper and lower canister chambers, an electric-motor fuel pump positioned within said upper chamber having a fuel inlet extending through said wall into said lower chamber, a primary fuel outlet for feeding fuel under pressure to an engine and a secondary fuel outlet for supplying fuel under pressure, and a glad extending through said wall from said pump to said lower chamber, said glad including passages forming said pump fuel inlet, fluid conduit means extending through said wall in parallel with said inlet passage and having an inlet end in said lower chamber adjacent to a lower end of said pump fuel inlet passage and an outlet end positioned in said upper chamber, and nozzle means coupling said pump secondary outlet to said fluid conduit means for aspirating vapor and fuel through said fluid conduit means from said lower chamber to said upper chamber.

2. A fuel delivery system for automotive engines and the like comprising:

a canister for positioning within a fuel tank and having a lower end with an opening and means forming an internal wall spaced from said lower end and dividing said canister into upper and lower canister chambers, an electric-motor fuel pump positioned within said upper chamber having a fuel inlet extending through said wall into aid lower chamber, a primary fuel outlet for feeding fuel under pressure to an engine and a secondary fuel outlet for supplying fuel under pressure, fluid conduit means extending through said wall having an inlet end in said lower chamber and an outlet end positioned in said upper chamber, said fluid conduit means including means forming a right-angle bend, and nozzle means coupling said secondary outlet to said fluid conduit means for aspirating vapor and fuel through said fluid conduit means from said lower chamber to said upper chamber, said nozzle means comprising an orifice extending through a wall of said conduit means to said secondary pump outlet and being aligned with a portion of said bend extending toward said outlet end of said conduit means.

3. The system as set forth in claim 1 wherein said fluid conduit passage means includes means forming a right-angle bend within said gland, said nozzle passage means being aligned with a portion of said bend extending toward said outlet end of said conduit means.

4. The system as set forth in claim 3 wherein said nozzle means comprises an orifice extending through a wall of said conduit means to said secondary pump outlet.

5. The system as set forth in claim 2 wherein said fluid conduit means further includes standpipe means extending upwardly within said upper chamber to position said outlet end at a level corresponding to maximum fuel capacity of said upper chamber.

* * * * *

UNITED STATES PATENT AND TRADEMARK OFFICE
CERTIFICATE OF CORRECTION

PATENT NO. : 4,878,816
DATED : November 7, 1989
INVENTOR(S) : Charles H. Tuckey

It is certified that error appears in the above-identified patent and that said Letters Patent is hereby corrected as shown below:

Col. 3, Line 51, change "glad" to -- gland --.

Col. 3, Line 52, change "glad" to -- gland --.

Signed and Sealed this

Thirtieth Day of October, 1990

Attest:

HARRY F. MANBECK, JR.

*Attesting Officer*    *Commissioner of Patents and Trademarks*